United States Patent [19]

Yanutola

[11] Patent Number: 4,461,866
[45] Date of Patent: Jul. 24, 1984

[54] PREPARATION OF WATER-IN-OIL EMULSIONS

[75] Inventor: Michael J. Yanutola, Rock Hill, S.C.

[73] Assignee: Sun Chemical Corporation, New York, N.Y.

[21] Appl. No.: 381,032

[22] Filed: May 24, 1982

[51] Int. Cl.³ .............................................. C08K 3/34
[52] U.S. Cl. .................................... 524/779; 524/791; 524/801
[58] Field of Search ....................... 524/779, 791, 801; 523/337

[56] References Cited

U.S. PATENT DOCUMENTS 3,284,393 11/1966 Vanderhoff et al. ................. 524/801
4,379,883 4/1983 Zecher ................................. 524/801

FOREIGN PATENT DOCUMENTS 2030578 4/1980 United Kingdom ................ 524/801

*Primary Examiner*—Paul R. Michl
*Attorney, Agent, or Firm*—Cynthia Berlow

[57] ABSTRACT

Cationic water-in-oil emulsions of water-soluble polymers and copolymers of at least one ethylenically unsaturated monomer are prepared by including in the formulation a metal halide and sodium silicate. The products are useful as drainage aids, retention aids, flotation aids, process water flocculants, and the like in the manufacture of paper and paper products; waste effluent treatment; oil recovery operations; and mining applications.

9 Claims, No Drawings

PREPARATION OF WATER-IN-OIL EMULSIONS

This invention relates to making polymers and copolymers of water-soluble ethylenically unsaturated monomers. More particularly it relates to the preparation of cationic water-in-oil emulsions of polymers and copolymers of water-soluble ethylenically unsaturated monomers.

BACKGROUND OF THE INVENTION

Processes for making water-in-oil emulsions of ethylenically unsaturated polymers and copolymers are known. A typical technique for making such emulsions is disclosed in U.S. Pat. No. 3,284,393 which is incorporated herein by reference. This method comprises forming a water-in-oil emulsion of a water-soluble ethylenically unsaturated monomer having a water-solubility of at least 5 weight percent or an aqueous solution thereof in an inert hydrophobic liquid organic dispersion medium containing between 0.1 and 10 percent by weight of a water-in-oil emulsifying agent, wherein the proportion of monomer phase ranges between 30 and 70 percent of the emulsion; heating the emulsion under free radical-forming conditions to polymerize the monomer in a disperse phase in the dispersion medium; and recovering the polymerized latex product.

SUMMARY OF THE INVENTION

The performance of water-in-oil emulsions of water-soluble polymers and copolymers of at least one ethylenically unsaturated monomer is improved by including in the formulation a metal halide and sodium silicate. The high molecular weight polymer and copolymer products are particularly useful as drainage aids, retention aids, flotation aids, process water flocculants, and the like in the manufacture of paper and paper products; waste effluent treatment; oil recovery operations, and mining applications.

DETAILED DESCRIPTION OF THE INVENTION

A water-in-oil emulsion of polymers or copolymers of at least one ethylenically unsaturated monomer is prepared by the steps of (1) adding the aqueous phase with stirring to the oil phase; (2) adding the initiator; and (3) heating to effect polymerization.

The performance of these polymers as, for example, drainage aids or retention aids for paper can be improved by increasing the molecular weight of the polymer. Many ways have been suggested for increasing molecular weight, such as adjustments in the initiator level, the polymer solids, or the reaction temperature. It has now been found that the performance of the polymers made by inverse emulsion polymerization can be improved by adding a metal halide salt, such as for example, a halide of sodium, calcium, potassium, lithium, magnesium, or the like, or mixtures thereof. Any amount of salt can be added to the aqueous phase up to its saturation point, and preferably the amount of salt added is about 2.0 to 10.0 percent, based on the weight of the aqueous phase. The inclusion of the salt results in improved performance, possibly attributed to higher molecular weight with extended chains.

There is, however, a disadvantage to including a metal halide in the emulsion. When emulsions of this type are polymerized in metal reactors, including stainless steel, there results a large amount of difficultly-removable gel (polymer build-up or scale) on any exposed metal surface of the reactor, the amount of build-up being particularly large when a metal salt is used in the formulation.

In order to avoid the need for expensive clean-up, problems of heat transfer, and loss of product when using metal polymerization vessels, it has been suggested that the reaction be carried out in glass, glass-lined, or Teflon-lined equipment. With such equipment, a film does form on the surface, but it can be removed easily. There are, however, heat transfer problems when such reactors are used.

Attempts to solve the problem of gel formation with metal reactors have been made. When, for example, no salt was added, gel on the metal surface was negligible, but polymer activity, that is, how the polymer behaved as a drainage and retention aid, was greatly diminished. When another salt such as magnesium sulfate was used instead of the metal halide, very little gel adhered to the steel vessel, but here too polymer activity was greatly reduced.

It has now been found that these problems can be avoided and a metal halide can be used to advantage in making cationic water-in-oil emulsion polymers and copolymers when sodium silicate is included in the formulation. The addition of the sodium silicate to the aqueous phase of the emulsion results in practically no adhered gel to polished stainless steel surfaces after polymerization. The amount of sodium silicate that is included is generally about 3200 to 12000 ppm, based on the aqueous phase. In addition to reducing the amount of film on a polished metal surface, the sodium silicate significantly reduces the amount of filtered gel and grit, making the product polymer or copolymer emulsion especially useful as a drainage aid or a retention aid in making papers; waste effluent treatment; oil recovery operations; and mining applications.

Typical monomers include, but are not limited to, acrylamide, methacrylamide, acrylic acid, methacrylic acid, sodium p-vinylbenzenesulfonate, 2-sulfoethylacrylate, dimethylaminoethyl methacrylate and its quaternary ammonium salts, vinylbenzyltrimethylammonium chloride, 2-acrylamide-2-methylpropane sulfonic acid, and the like, and their mixtures, having a water solubility of at least 5 weight percent, and aqueous solutions thereof. When aqueous solutions are used, they contain about 30 to 60 weight percent of the monomer or monomers.

The oil used in the preparation of the emulsions may be any of a variety of organic liquids including liquid hydrocarbons and substituted liquid hydrocarbons, such as for example benzene, toluene, xylene, mineral oils, kerosenes, naphthas, petrolatums, and the like and their mixtures.

The ratio of the amounts of oil and water used to prepare the emulsions may vary over a wide range; generally the ratio of oil:water is between about 1-5:1-10, and preferably the ratio is about 1:1.2-10. The proportion of the monomer phase is between about 20 and 70 percent, and preferably between about 25 and 35 percent, of the emulsion.

In preparing these emulsions, an emulsifying agent of the water-in-oil type is required in an amount that may range from about 0.1 to 10 percent of the weight of the oil phase. Suitable emulsifying agents include, but are not limited to, hexadecyl sodium phthalate, sorbitan monooleate, cetyl sodium phthalate, stearyl sodium phthalate, metal soaps, and the like, and their mixtures.

A free radical-forming initiator is also employed. Typical initiators include oil-soluble peroxides or azo-type initiators, water-soluble persulfates, or redox mixtures, such as benzoyl peroxide, lauryl peroxide, potassium persulfate, and the like, and their mixtures, in amounts of about 0.002 to 0.2 percent by weight of the oil or aqueous phase, depending upon the solubility of the initiator. It is also possible to carry out the polymerization by other means, such as high energy radiation.

Generally the high molecular weight polymers and copolymers of this invention are prpeared by adding the aqueous phase to the oil phase with stirring, adding the initiator, and heating to about 40° to 70° C. to effect polymerization.

The addition of the aqueous phase to the oil phase results in a water-in-oil monomer emulsion, the oil phase being continuous and the aqueous phase existing as tiny droplets in the oil phase. This emulsion is gradually heated to 40°-45° C. while sparging with nitrogen gas to reduce the headspace oxygen level of the reactor to less than about 1000 ppm, and preferably to less than about 300 ppm. After the temperature has been lined out at 40°-45° C. and the oxygen reduced to an acceptable level, sparging is continued and half of the initiator is added. The temperature is held at 40°-45° C. for about 4-7 hours, the remainder of the initiator is added, and the batch heated to 65°-70° C. where it is held for about 1 hour. The batch is then cooled to room temperature.

The polymers and copolymers made by this process have molecular weights within the range of about 5 to 10 million and leave no troublesome polymer build-up on the walls of polished steel reactors. The cationic emulsions of this invention are particularly useful as drainage aids, retention aids, flotation aids, process water flocculants, and the like in the manufacture of paper and paper products.

They can, if desired, easily be inverted into water by any of a variety of known procedures.

The invention is further illustrated by the following examples in which all parts and percentages are by weight:

EXAMPLE 1

A water-in-oil copolymer emulsion was prepared as follows:

(A) Aqueous Phase

The following ingredients were combined with stirring until homogeneous:

|  | Parts |
| --- | --- |
| 50% aqueous acrylamide | 52.16 |
| dimethyl sulfate quaternary salt of dimethylaminoethyl methacrylate | 3.08 |
| deionized water | 17.57 |
| sorbitan monooleate (HLB 10) | 1.42 |
| tetrasodium ethylenediamine tetraacetate | 0.006 |
| sodium chloride | 4.69 |
| sodium silicate | 0.51 |

(B) Oil Phase

The following ingredients were combined with stirring until homogeneous:

|  | Parts |
| --- | --- |
| low odor paraffinic solvent | 19.3 |
| sorbitan monooleate (HLB 4.3) | 1.6 |

Part (A) was added to part (B) with continued mixing in a polished stainless steel reactor. The resulting water-in-oil comonomer emulsion was gradually heated to 40°-45° C. while being sparged with nitrogen gas to reduce the level of headspace oxygen and 200 ppm. Sparging was continued and 0.0025 part of 2,2'-azobis (2,4-dimethylvaleronitrile) was added. A mild exotherm started and continued for about 4-6 hours; after the exotherm ceased, the temperature of the batch was held at 40°-45° C. for an hour. 0.0025 Part of 2,2'-azobis 2,4-dimethylvaleronitrile) was added, and the batch heated to 65°-70° C. where it was held for one hour. The batch was then cooled to room temperature. The product was a cationic copolymer emulsion having a molecular weight of 10 million. There was no gel build-up on the walls of the reactor.

EXAMPLE 2

(comparative)

To illustrate the need for the sodium silicate, the procedure of Example 1 was repeated except the sodium silicate was omitted. There was heavy gel build-up on the walls of the reactor.

EXAMPLE 3

The procedure of Example 1 was repeated with each of the following monomers instead of acrylamide/-dimethylsulfate quaternary salt of dimethylaminoethyl methacrylate: acrylamide/dimethylaminoethyl methacrylate; acrylamide/dimethylaminoethyl acrylate; acrylamide/dimethylaminoethyl methacrylate hydrochloride, acrylamide/dimethylaminoethyl methacrylate hydrosulfate, acrylamide/dimethylaminoethyl acrylate hydrochloride, acrylamide/dimethylaminoethyl acrylate hydrosulfate, acrylamide/diethylaminoethyl methacrylate, acrylamide/diethylaminoethyl methacrylate hydrochloride, acrylamide/diethylaminoethyl methacrylate hydrosulfate, acrylamide/diethylaminoethyl acrylate, acrylamide/diethylaminoethyl acrylate hydrochloride, acrylamide/diethylaminoethyl acrylate hydrosulfate, acrylamide/dimethylaminopropyl methacrylamide, acrylamide/methacryl amidopropyltrimethylammonium chloride, acrylamide/isopropylaminopropylmethacrylamide, acrylamide/methacrylamidopropylhydroxyethyldimethylammonium acetate, and homopolymers of acrylamide.

The results were comparable.

EXAMPLE 4

The procedure of Example 1 was repeated with each of the following oils instead of the low odor paraffinic solvent: kerosenes, mineral spirits, odorless kerosenes, and odorless mineral spirits.

The results were comparable.

EXAMPLE 5

The procedure of Example 1 was repeated using dialkylphenol polyethylene oxide (HLB 9.4) instead of sorbitan monooleate (HLB 10) and nonylphenol polyethylene oxide (HLB 4.6) in place of sorbitan monooleate (HLB 4.3).

The results were comparable.

EXAMPLE 6

The procedure of Example 1 was repeated except that after the batch had cooled 2.0 parts of nonylphenol polyethylene glycol ether (HLB 11.7) was added. The product was then inverted into water by stirring or shaking and it was fully hydrated and dissolved after 30 minutes.

EXAMPLE 7

The procedure of Example 1 was repeated except that the following ingredients were used in the oil phase:

|  | Parts |
| --- | --- |
| low odor paraffinic solvent | 19.1 |
| sorbitan monooleate (HLB 4.3) | 1.4 |

During processing 0.003 part of 2,2'-azobis (2,4-dimethylvaleronitrile) and 2.14 parts of nonylphenol polyethylene oxide were added to the emulsion.

There was no gel build-up on the walls of the reactor.

EXAMPLE 8

The use of a product of this invention as a retention aid under turbulent conditions was demonstrated by the following procedure:

A furnish composed of 50% of hardwood Kraft and 50% of softwood Kraft was diluted to approximately 6% solids. The following materials were added to the furnish: 10% of titanium dioxide, 5% of Ansilex, 8% of clay as a 70% slurry, and 1.5% of alum as a 5% solution, all percentages being based on the weight of dry fiber. The final consistency was 0.83% and the fines fraction was 26.5%. The pH was adjusted to 5.2.

A 500-ml. portion of the furnish was used with amounts of the product of Example 1 that provided either 1.0 pound or 1.5 pounds per ton of fiber. The furnish and emulsion were placed in a Dynamic Drainage Jar equipped with a 100-mesh wire. The sample was stirred at 800 rpm for 30 seconds and then drained for 30 seconds while being stirred. The drainage was collected in a weigh cup, weighed, filtered, dried, and weighed again. A duplicate was run for each sample.

The following equations were used to determine the retention:

$$\text{Unretained} = \frac{\text{filter weight} \times \frac{\text{sample size}}{\text{drainage weight}}}{\text{total fines}} \times 100 \quad \text{Equation 1}$$

$$\text{Percent retention} = 100 - \text{retained} \quad \text{Equation 2}$$

The results are tabulated below:

TABLE

|  | Dosage (lb./ton) | Drainage Weight (grams) | Filter weight (mg) | Retention (% fines) |
| --- | --- | --- | --- | --- |
| Product of Example 1 | 1.0 | 139.2 | 105 | 65.7 |
|  |  | 128.1 | 70 | 75.2 |
| Product of Example 1 | 1.5 | 139.8 | 100 | 67.5 |
|  |  | 138.2 | 86 | 71.7 |
| Control | 0 | 129.2 | 109 | 61.7 |

EXAMPLE 9

The procedure of Example 1 was repeated except that the sodium chloride was omitted. There was no gel build-up on the walls of the reactor.

What is claimed is:

1. In a process for making water-in-oil emulsions of homopolymers or copolymers of at least one water-soluble ethylenically unsaturated monomer by the steps of (1) forming a water-in-oil emulsion of said monomer or comonomers or aqueous solution thereof in an inert hydrophobic liquid organic dispersion medium containing an emulsifying agent and (2) heating said emulsion under free radical-forming conditions to polymerize said monomer or comonomers in a disperse phase, the improvement which consists of including sodium silicate combined with a metal halide in the aqueous phase of said water-in-oil emulsion.

2. The improvement of claim 1 wherein the amount of sodium silicate is about 3200 to 12000 ppm, based on the aqueous phase.

3. The improvement of claim 1 wherein the metal halide is present in an amount up to its saturation point.

4. The improvement of claim 1 wherein the amount of metal halide is about 2.0 to 10.0 percent, based on the weight of the aqueous phase.

5. The improvement of claim 1 wherein the metal halide is a halide of sodium, calcium, potassium, lithium, or magnesium, or a mixture thereof.

6. The process of claim 1 wherein the monomer is acrylamide.

7. The process of claim 1 wherein the monomer is a mixture of acrylamide and at least one other ethylenically unsaturated comonomer.

8. The process of claim 7 wherein the monomer is a mixture of acrylamide and the dimethyl sulfate quaternary salt of dimethylaminoethyl methacrylate.

9. A retention aid consisting of the water-in-oil emulsion product of claim 1.

* * * * *